United States Patent [19]

Onoda et al.

[11] Patent Number: 5,178,703
[45] Date of Patent: Jan. 12, 1993

[54] BREAKER WITH WOUND BAND

[75] Inventors: Makoto Onoda, Hanau am Main, Fed. Rep. of Germany; Syuichi Yamamori, Toyota, Japan; Youichiro Hirosawa, Kobe, Japan; Hiroaki Sakuno, Fukushima, Japan

[73] Assignee: Sumitomo Rubber Industries, Ltd., Hyogo, Japan

[21] Appl. No.: 773,263

[22] Filed: Oct. 9, 1991

[30] Foreign Application Priority Data

Oct. 24, 1990 [JP] Japan .................. 2-287932
Nov. 2, 1990 [JP] Japan .................. 2-298386

[51] Int. Cl.$^5$ ........................... B60C 9/20
[52] U.S. Cl. ..................... 152/533; 152/531
[58] Field of Search .......... 152/533, 531, 526; 156/117

[56] References Cited

U.S. PATENT DOCUMENTS

| | | | |
|---|---|---|---|
| 3,991,803 | 11/1976 | Pruszek | 152/361 |
| 4,869,307 | 9/1989 | Borman et al. | 152/533 |
| 4,924,928 | 5/1990 | Watanabe et al. | 152/533 |
| 4,989,658 | 2/1991 | Maathuis et al. | 152/533 |

FOREIGN PATENT DOCUMENTS

| | | |
|---|---|---|
| 0258822 | 3/1988 | European Pat. Off. |
| 3911031 | 10/1989 | Fed. Rep. of Germany |
| 60-213505 | 10/1985 | Japan |
| 61-15604 | 1/1986 | Japan |
| 815055 | 6/1959 | United Kingdom |

Primary Examiner—Michael W. Ball
Assistant Examiner—Sharon Vickery
Attorney, Agent, or Firm—Birch, Stewart, Kolasch & Birch

[57] ABSTRACT

A pneumatic tire which comprises a carcass and a band disposed radially outside the carcass, the band made of parallel cords wound spirally around the breaker, the band comprising a plurality of circumferential portions which are at least one parallel cord portion in which the windings of the band cords are laid in parallel with the tire equator and at least one inclined cord portion in which the windings of the band cords are laid at an inclination angle of 0.3 to 5 degrees to the tire equator, and the total circumferential length of the at least one inclined cord portion being not more than 50% of the whole circumferential length of the band.

3 Claims, 5 Drawing Sheets

BREAKER WITH WOUND BAND

The present invention relates to a belted pneumatic tire, more particularly an improvement in the belt structure, which is capable of improving tire uniformity and high speed durability.

In Japanese Utility Model Publication No. 61-15604, a belted radial tire having a band belt made by spirally winding cords around a breaker belt is disclosed.

Such a band provides a tight hooping effect, and thereby a so called tread lifting phenomenon due to the centrifugal force during high speed running can be effectively prevented, and durability is improved to a high level.

However, recently the requirements for the tires become very severe and are not satisfied by such a belt structure.

In the above-mentioned belt structure, the cords are wound spirally such that the cords are inclined with respect the tire equator at a certain angle through the whole circumferential length of the band. As a result, the tire uniformity is liable to be disturbed, and uneven tire deformation is caused, and durability is lowered, which is particularly notable during high speed running.

It is therefore, an object of the present invention to provide a pneumatic tire in which high speed durability is improved by improving uniformity of belt reinforcements.

According to one aspect of the present invention, a pneumatic tire comprises.

A carcass having at least one ply of cords extending between bead portions, and a band disposed radially outside the carcass and inside a tread and made of parallel cords wound spirally around the breaker, the band comprising a plurality of circumferential portions which are at least one parallel cord portion in which the windings of the band cords are laid in parallel with the tire equator and at least one inclined cord portion in which the windings of the band cords are laid at an inclination angle of 0.3 to 5 degrees to the tire equator, the total circumferential length of the at least one inclined cord portion being not more than 50% of the whole circumferential length of the band.

Therefore, in the major circumferential portion of the band the band cords are laid in parallel with the tire equator, and accordingly uniformity of the tread portion is improved to improve high speed durability of the tire.

Embodiments of the present invention will now be described in detail in conjunction with the accompanying drawings, in which.

Figure 1:
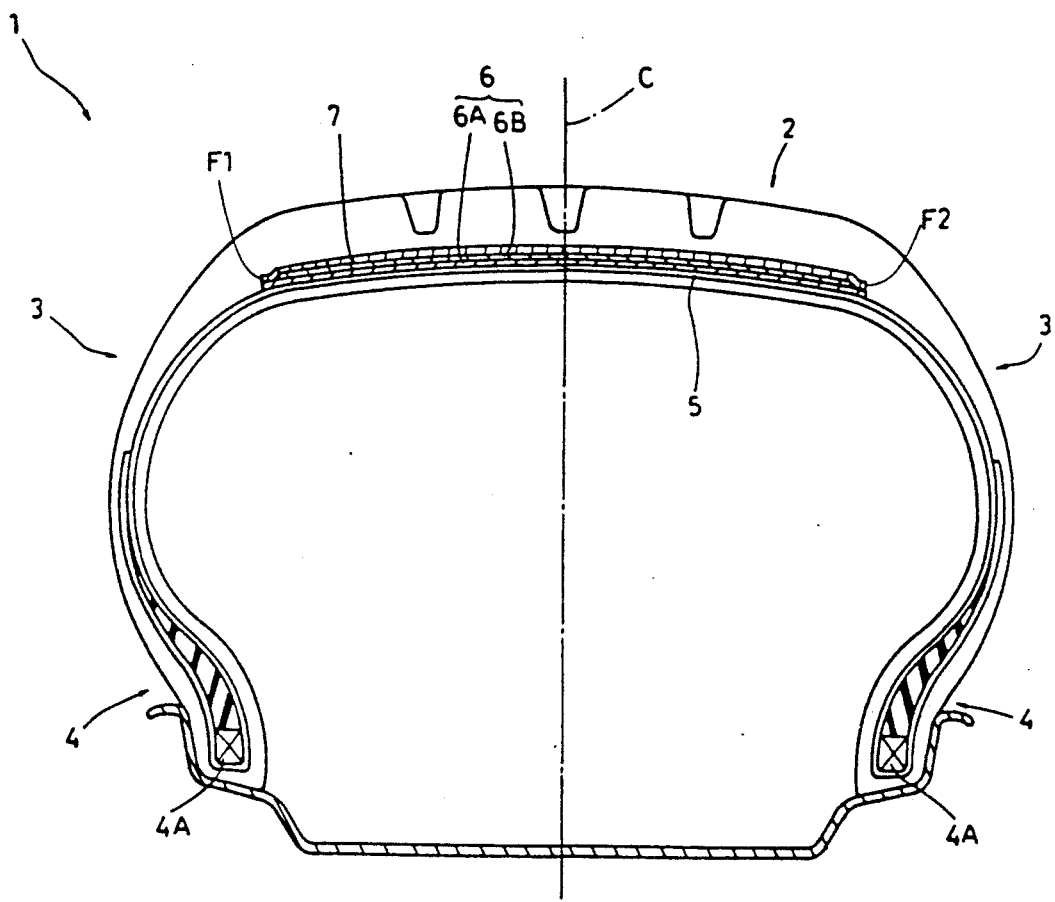
FIG. 1 is a cross sectional view of a tire according to the present invention.
Figure 2:
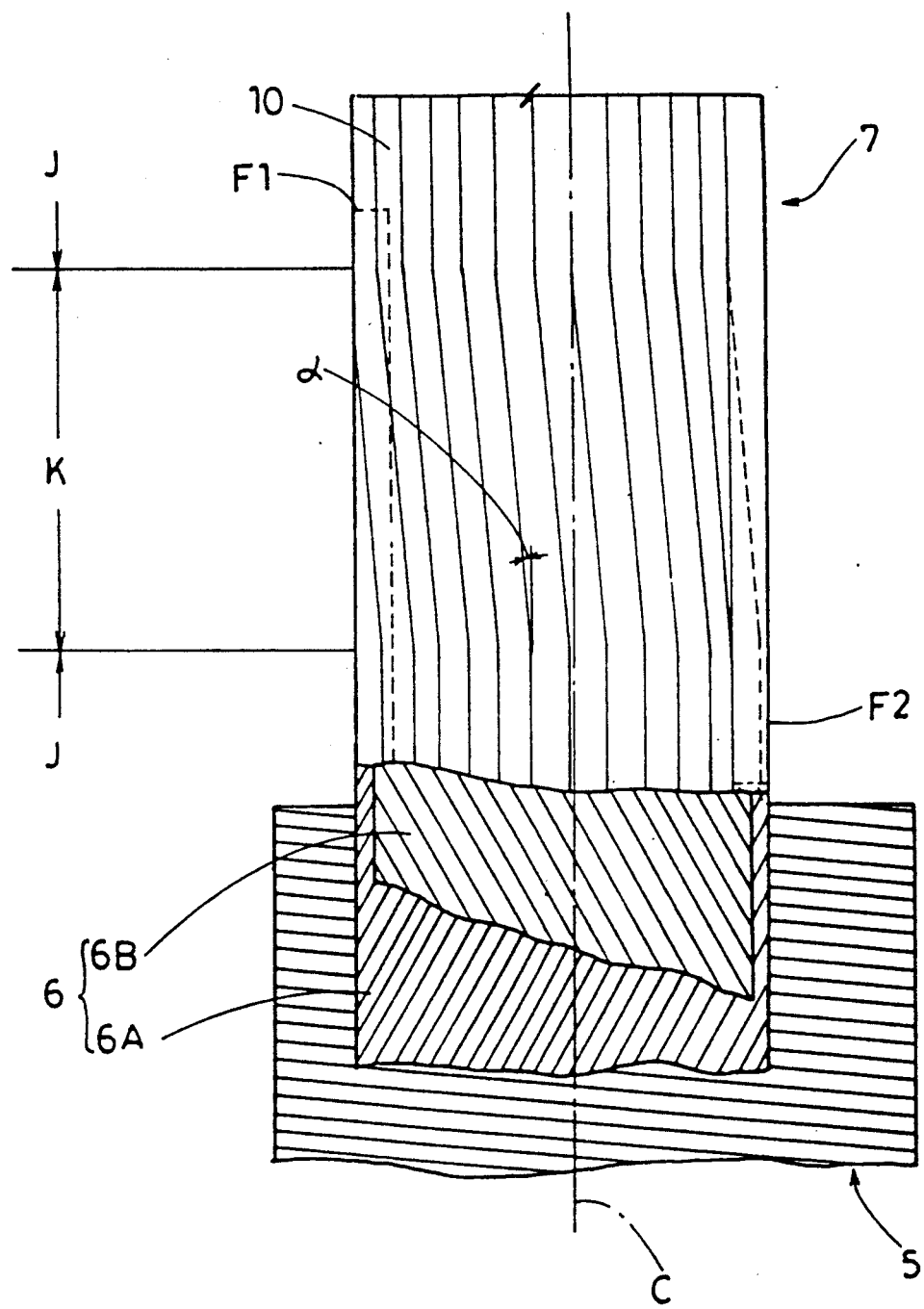
FIG. 2 is a developed plan view showing the carcass and band thereof.

In FIGS. 1 and 2, pneumatic tire 1 is for passenger car use and has a tread portion 2, a pair of axially spaced bead portions 4, and a pair of sidewall portions 3 extending between the tread edges and the bead portions.

The tire 1 comprises a pair of bead cores 4A disposed one in each of the bead portions 4, a toroidal carcass 5 extending between the bead portions 4 and turned up around the bead cores 4A, and a belt reinforcements 6 and 7 disposed radially outside the carcass and inside a rubber tread.

The carcass 5 comprises at least one ply of cords extending between the bead portions 4 and turned up around the bead cores 4A from the axially inside to the outside thereof to form two turned up portion and one main portion therebetween.

The carcass cords are arranged radially at 60 to 90 degrees with respect to the tire equator C to provide a radial or so-called semiradial ply structure.

For the carcass cords, organic fiber cords, e.g. nylon, aromatic polyamide and the like are used.

The belt reinforcements in this embodiment includes a breaker 6 and a band 7.

The breaker 6 is disposed on the radially outside of the carcass crown, and comprises radially inner and outer plies 6A and 6B.

The radially inner breaker ply 6A is wider than the radially outer breaker ply 6B.

The breaker cords in each ply are laid at an angle of 15 to 40 degrees with respect to the tire equator C and parallel with each other, but crosswise to the cords in the next ply.

For the breaker cords, high elastic modulus cords, e.g. steel cords, organic fiber cords such as aromatic polyamide fiber cords and the like are used.

The band 7 is the radially outermost reinforcing cord layer and is disposed on the radially outside of the breaker 6 to extend axially across the whole width of the breaker 6 to cover the breaker edges.

The edges F1 and F2 of the band 7 in this embodiment are aligned with the breaker edges, but they can be projected therefrom.

The band 7 is made of parallel cords wound spirally around the breaker 6 and continuously from one edge to the other edge thereof.

The number of the parallel cords is preferably in the range of 6 to 20.

The band 7 in this embodiment is as shown in FIG. 2 composed of two circumferential portions, a parallel cord portion J and an inclined cord portion K.

The parallel cord portion J is such that the windings of the band cords are laid parallel with the tire equator C.

The inclined cord portion K is such that the windings of the band cords are laid at a small angle (alpha) of 0.3 to 5 degrees, more preferably 1 to 3 degrees, with respect to the tire equator C.

The circumferential length of the inclined cord portion K is 20 to 50% of the whole 360 degree circumferential length.

If the circumferential length of the inclined cord portion K is less than 20%, the inclination angle becomes too large, and it becomes difficult to make such a band.

If more than 50%, the parallel cord portion J becomes too short and uniformity can not be improved.

Figure 3:
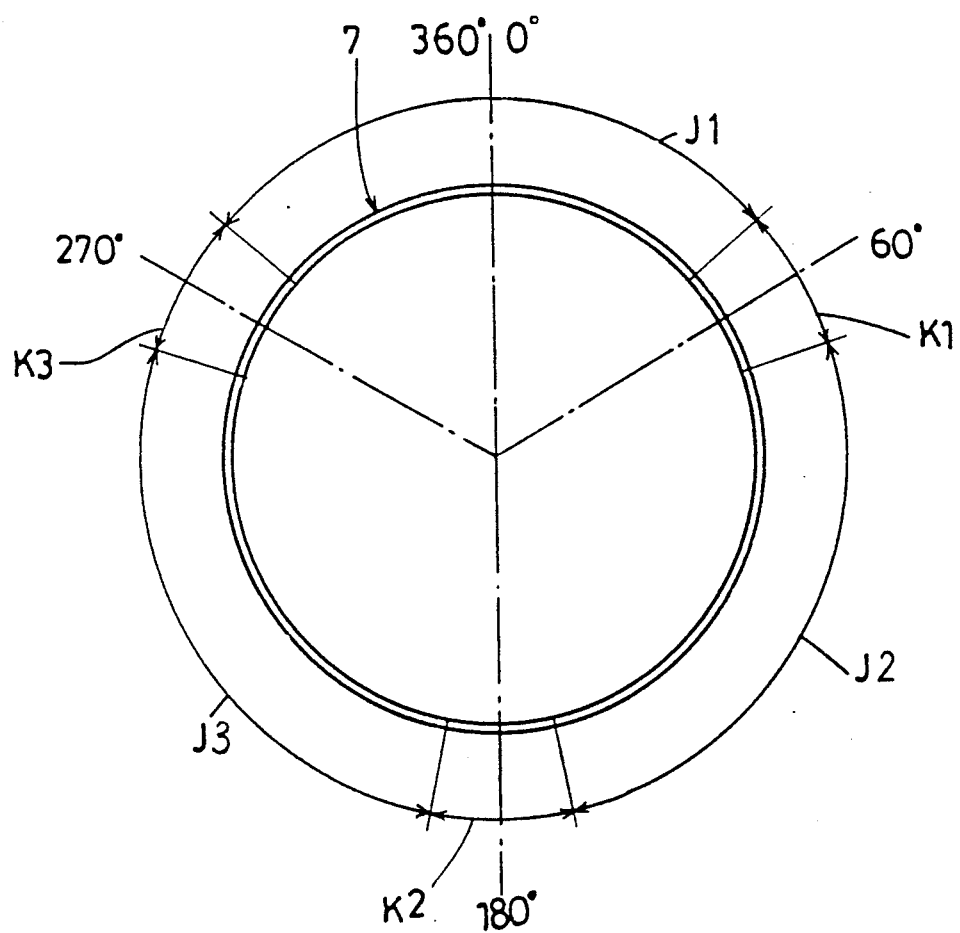
FIGS. 3 and 4 are respectively a side view and a developed partial plan view of another example of the band.
Figure 4:
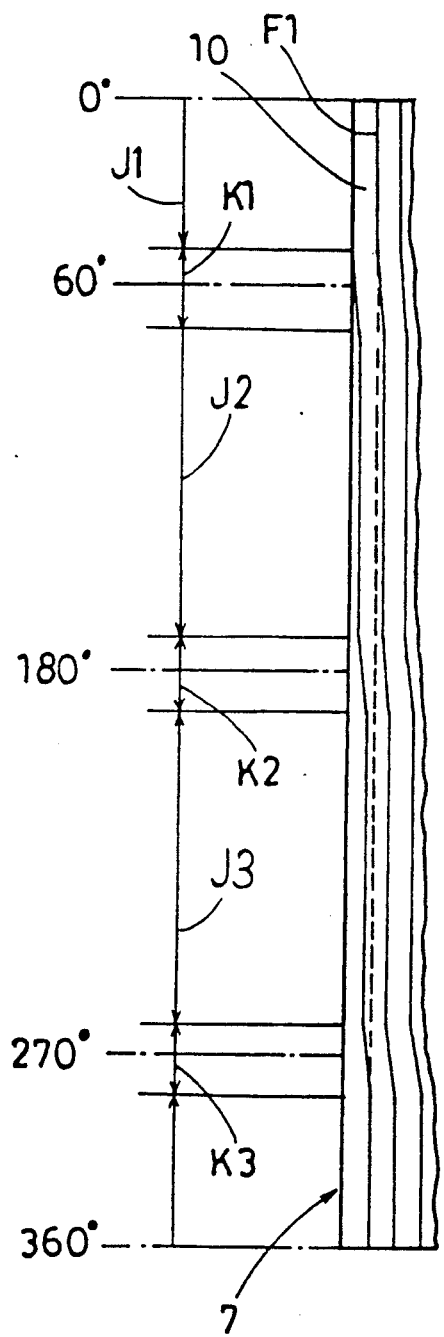

FIGS. 3 to 4 show another example of the band, in which the band 7 is composed of alternate parallel cord portions and inclined cord portions. In this example, the band 7 is composed of alternate three parallel cord portions J1, J2 and J3 and three inclined cord portions K1, K2 and K3.

The inclined cord portions K1-K3 have substantially same circumferential lengths, the total of which is not more than 25% of the whole 360 degree circumferential length of the band.

Also the parallel cord portions J1-J3 have substantially same circumferential lengths.

If the total circumferential length of the inclined cord portions is more than 25%, uniformity can not be obtained, and durability is impaired.

The inclined cord portions K1, K2 and K3 (and accordingly parallel cord portions) are disposed symmetrically around the tire axis at substantially regular pitch angles (in this example every 120 degrees).

The windings of the band cords in each inclined cord portion are also laid at a small angle (alpha) of 0.3 to 5 degrees, more preferably 1 to 3 degrees, with respect to the tire equator C, and those in each parallel cord portion are parallel with the tire equator C.

Figure 5:
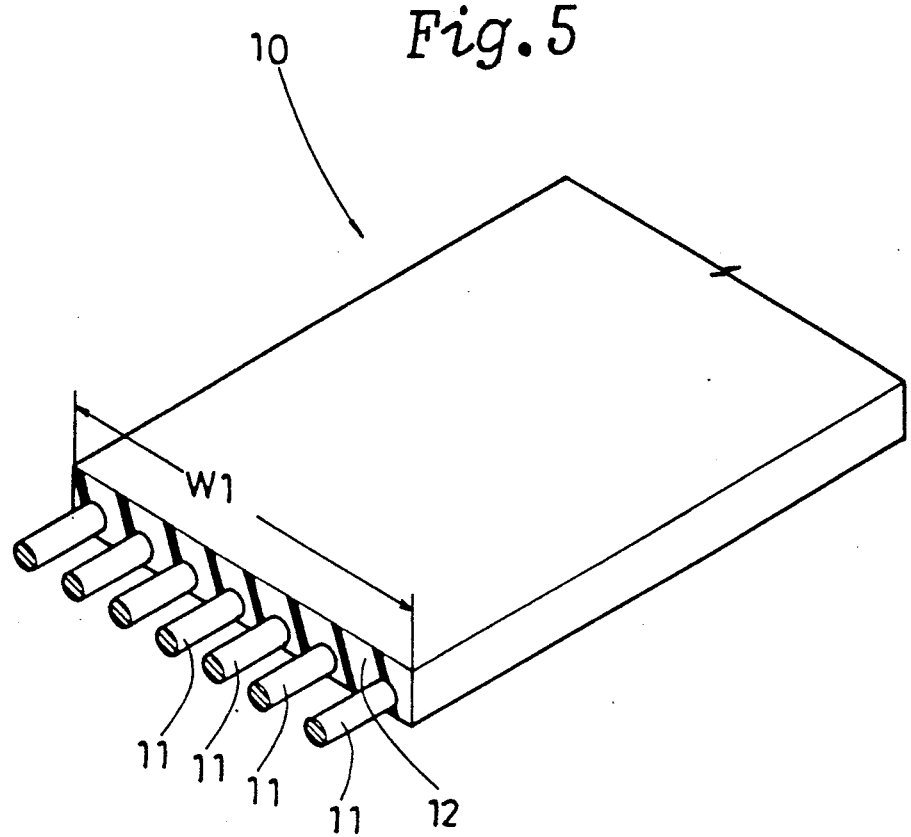
FIG. 5 is a perspective view of a ribbon of rubber used to form the band.

The above-mentioned bands 7 are formed by winding a ribbon of rubber 10 shown in FIG. 5.

The ribbon 10 is such that the band cords 11 are embedded in coating rubber 12 in parallel with each other along the longitudinal direction thereof.

The cross sectional shape of the ribbon 10 in this example is a flat rectangle.

Preferably organic fiber cords having a heat shrinking nature such as 66-nylon are used. By using such cords, the band cords are shrunk during vulcanization to increase the hooping force by the band, and the tire uniformity is improved.

In the widthwise direction of the ribbon 10, the cords 11 are laid at substantially regular intervals, and the number of the cords embedded is preferably in the range of 6 to 20 as explained above.

When the cord number is less than 6, the width W1 of the ribbon 10 becomes too small and the winding number or the number of windings of the ribbon is increased, which lowers the productivity and increases the manufacturing cost.

When the number is more than 20, the width W1 of the ribbon 10 becomes too large, and as a result the cord inclination angle in the inclined cord portion is increased and the tire uniformity is deteriorated.

Starting from the band edge F1, the ribbon 10 is wound around the radially outside of the breaker 6 spirally and continuously to the other band edge F2.

As shown in FIGS. 2 and 4, in the parallel cord portions J, J1-J3 the ribbon 10 is wound in parallel with the tire equator C, and in the inclined cord portions K, K1-K3 the ribbon is wound at the above mentioned small inclination angle (alpha).

In the above-mentioned examples, the ribbon 10 is wound closely so that the windings are not overlapped excepting the band edge portions. In the edge portion, the ribbon 10 is wound along the band edge F1, F2 at least one turn to make the axially outermost winding, the whole of which is parallel with the tire equator C, and which is overlapped with the next winding, whereby the ends of the ribbon 10 are prevented from being loosened, and a further reinforcement is provided at the breaker edges to prevent breaker edge separation failure.

Passing through the sole inclined cord portion (FIGS. 1-2) or all of the inclined cord portions (FIGS. 3-4), the ribbon 10 is progressed by one spiral pitch. In other words, in order to progress the ribbon one spiral pitch, the width of the ribbon (or the number of the embedded cords), the overlap width and the like are determined based on the above-mentioned limitations for the inclination angle and the total circumferential length of the inclined cord portion(s).

If the inclination angle (alpha) is more than 5 degrees, which means that the bent angle of the ribbon 10 at the boundary between the parallel and inclined cord portions is more than 5 degrees, an undesirable stress is caused around the boundary, and further it becomes difficult to make such a band.

The joint of the tread rubber which is wound on the radially outside of the band and the circumferential ends or joint of the breaker ply are preferably disposed within the parallel cord portion(s), whereby separation failure being possible during high speed running can be avoided.

As explained above, in the two examples, the windings of the ribbon 10 are not overlapped excepting the band edge portions.

Figure 6:
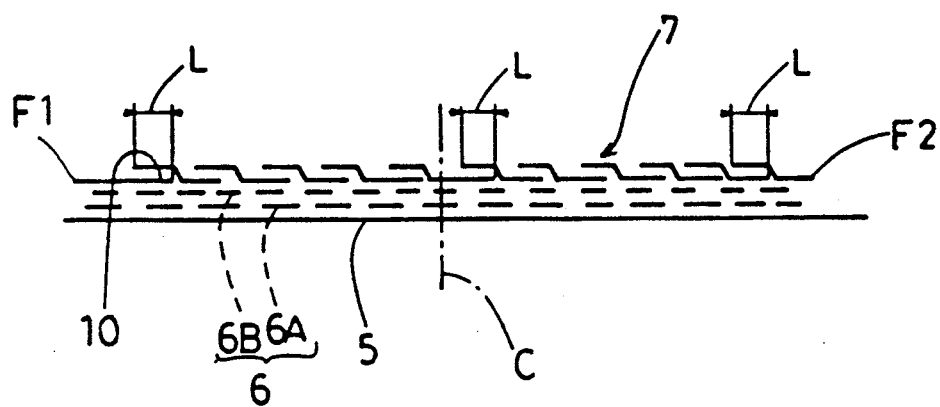
FIG. 6 is a sectional view of a modification of the band.

However, it can be overlapped all over the width as shown in FIG. 6. The overlap widths L can be constant through all over the width, but it is also possible to vary the overlap widths in the axial direction such that the overlap widths increase gradually from the tread center towards the tread edges, or the overlap widths in the tread shoulder regions are larger than those in the tread crown region.

Further, it may be possible to wound the ribbon in an opened state.

Furthermore, immediately inside the above explained band 7 a similar band can be disposed so as to provide for the tire with a double-layered band structure.

As described above, in the pneumatic tires according to the present invention, the spiral cord band comprises the major parallel cord portion and the minor inclined cord portion, whereby tire uniformity and high speed durability are improved.

We claim:

1. A pneumatic tire comprising
a carcass having at least one ply of cords extending between bead portions, a breaker, and
a band disposed radially outside the carcass and inside a tread and made of parallel cords wound spirally around the breaker,
the band comprising two circumferential portions which are a parallel cord portion in which the windings of the band cords are laid in parallel with the tire equator and
an inclined cord portion in which the windings of the band cords are laid at an inclination angle of 0.3 to 5 degrees to the tire equator,
the circumferential length of the inclined cord portion being 20 to 50% of the whole 360 degree circumferential length of the band.

2. A pneumatic tire comprising
a carcass having at least one ply of cords extending between bead portions, a breaker, and
a band disposed radially outside the carcass and inside a tread and made of parallel cords wound spirally around the breaker,
the band comprising a plurality of circumferential portions which are
at least two parallel cord portions in which the windings of the band cords are laid in parallel with the tire equator and at least two inclined cord portions in which the windings of the band cords are laid at an inclination angle of 0.3 to 5 degrees to the tire equator,
said at least two inclined cord portions disposed substantially symmetrically around the tire axis,
the total circumferential length of said at least two inclined cord portions being not more than 25% of the whole 360 degree circumferential length of the band.

3. The tire according to claim 1 or 2, wherein said inclination angle is 1 to 3 degrees.

* * * * *